J. T. UNDERWOOD.
BURNER.
APPLICATION FILED FEB. 28, 1913.
1,078,227.
Patented Nov. 11, 1913.
2 SHEETS—SHEET 1.
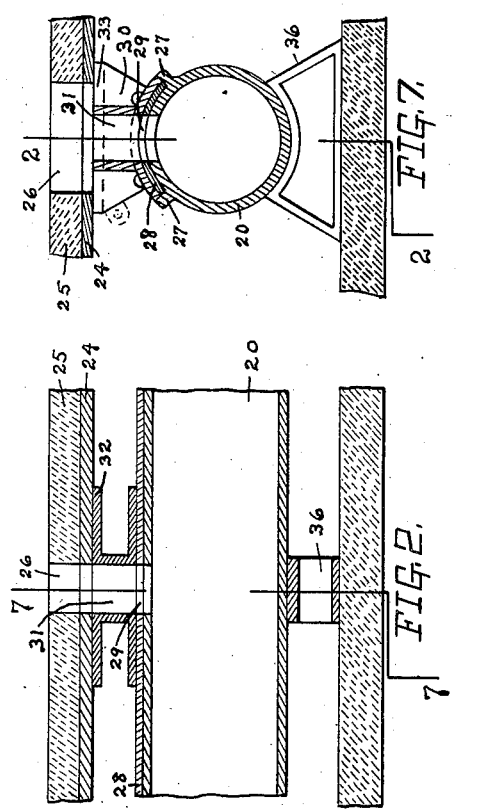
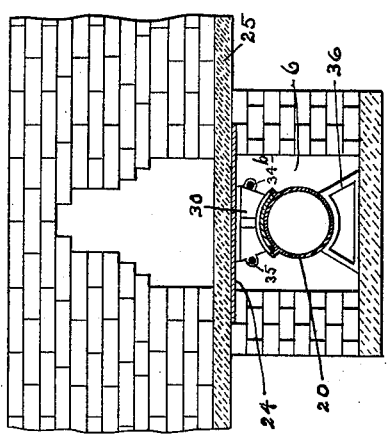
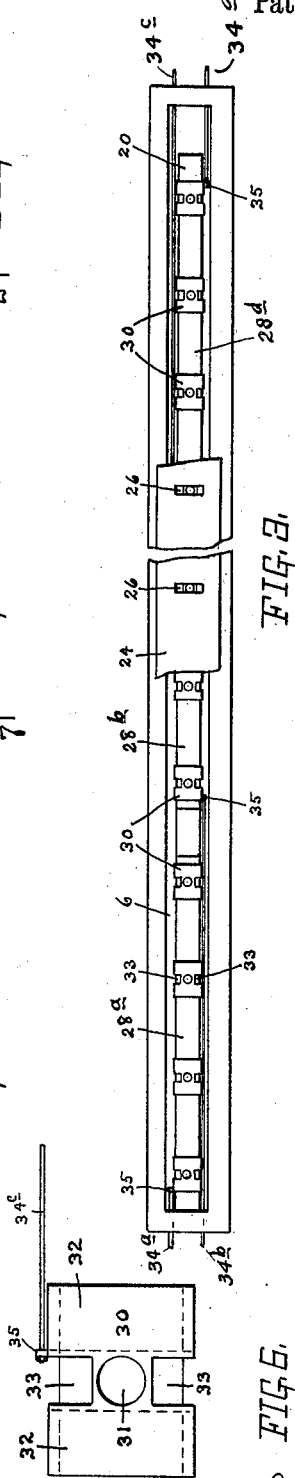
WITNESSES:
Hugo W. Kreinbring
Mary A. Hawthorne
INVENTOR
J. T. Underwood.
BY
Edward N. Pagelsen.
ATTORNEY

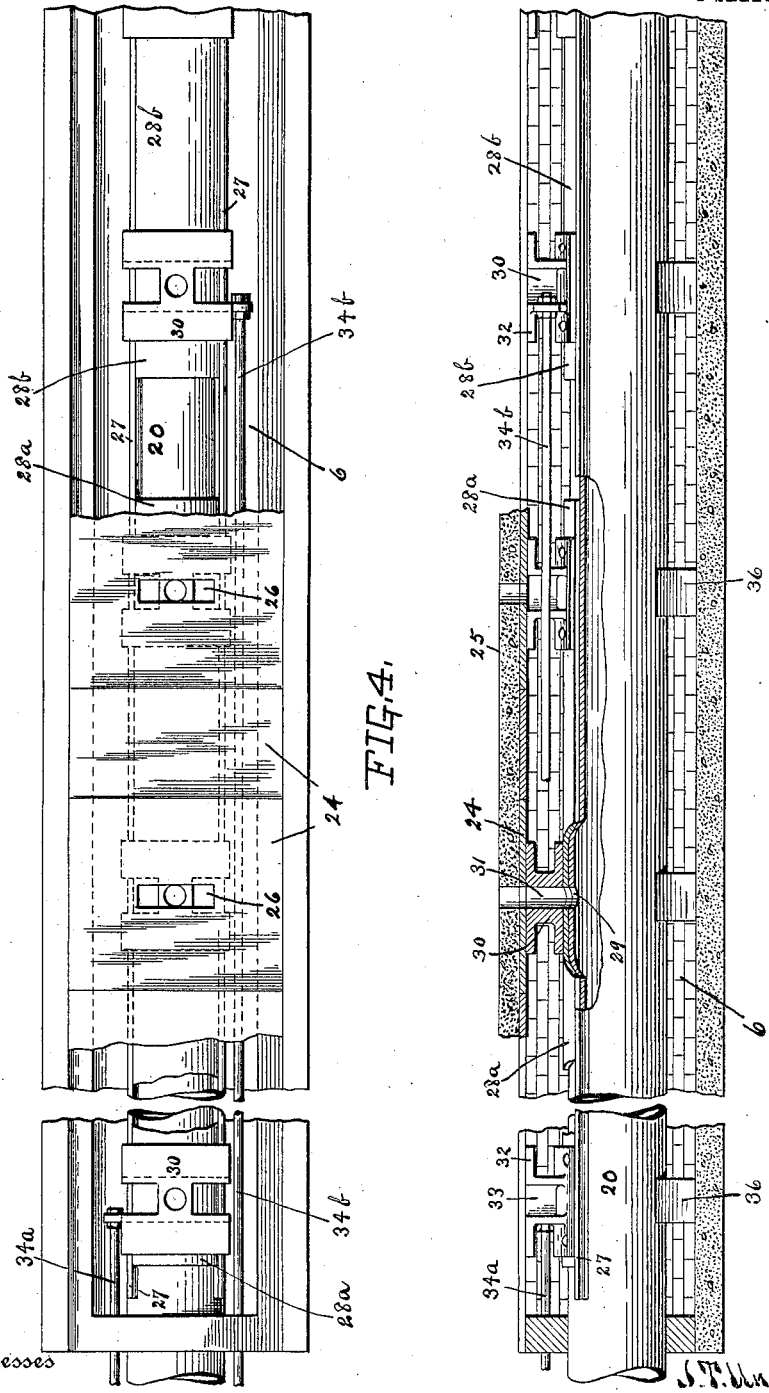

UNITED STATES PATENT OFFICE.

JOHN T. UNDERWOOD, OF DETROIT, MICHIGAN, ASSIGNOR TO UNDERWOOD ENGINEERING COMPANY, OF DETROIT, MICHIGAN, A CORPORATION OF MICHIGAN.

BURNER.

1,078,227.      Specification of Letters Patent.    Patented Nov. 11, 1913.

Application filed February 28, 1913. Serial No. 751,203.

*To all whom it may concern:*

Be it known that I, JOHN T. UNDERWOOD, a citizen of the United States, and a resident of Detroit, in the county of Wayne and State of Michigan, have invented a new and useful Burner, of which the following is a specification.

This invention relates to burners especially adapted for ovens, brick and tile kilns, and other installations where large amounts of inflammable gases are to be consumed, and its object is to provide a simple, inexpensive and easily manipulated gas burner which can be installed at comparatively low cost and which can be adjusted to meet the various conditions.

This invention consists in the combination with a conductor for the gas, and of a separate pipe mounted therein to convey the air, of a series of saddles mounted on the air-pipe provided with openings so that the saddles may be moved to register with both the discharge openings in said air-pipe and with the discharge openings of the gas conductor.

It further consists in so combining these saddles with operating mechanism that they can be readily moved in groups to control the burning of the gases.

In the accompanying drawings Figure 1 is a transverse section of a gas tunnel with the air-pipe therein together with a portion of a brick kiln. Fig. 2 is a section on the line 2—2 of Fig. 7. Fig. 3 is a plan of the air-pipe and the saddles thereon. Fig. 4 is a plan of the gas and air pipes similar to the left end of Fig. 3, but on a larger scale. Fig. 5 is a longitudinal section of the gas tunnel. Fig. 6 is a plan of a saddle. Fig. 7 is a section on the line 7—7 of Fig. 2.

Similar reference characters refer to like parts throughout the several views.

The construction shown in these drawings is especially adapted to be used with the brick kilns shown in the copending application of Charles K. Davis, Serial Number 751,195, filed February 28th, 1913, although not limited thereto.

This invention is particularly designed to facilitate the control of the flame of producer gas when used to burn brick and to control the supply of air to said flame, both air and gas being supplied under pressure.

A series of parallel tunnels under the floor of the kiln carry the gas to the desired points, and other passages convey the air.

As indicated in Fig. 1, the gas tunnel 6 has a cover plate 25, preferably of concrete or other good refractory material which is supported by a series of cast-iron plates 24 and which are supplied with apertures 26 at regular intervals, the number of these apertures depending upon the width of the kiln. The pipe 20 may be supported by the frames 36 and be formed with flanges 27, shown in Figs. 4, 5 and 7, while sheets $28^a$, $28^b$, $28^c$ and $28^d$ of steel or other proper material having central holes 29, will extend along the pipe 20 guided by the flanges 27 and have a series of saddles 30 secured to each of them. These saddles have upwardly extending passages 31, and flanges 32 having notches 33, all adapted to register with the openings 26. A series of rods $34^a$, $34^b$, $34^c$ and $34^d$ connect to lugs 35 on these saddles and extend longitudinally outwardly from the ends of the tunnel so that each of the connecting plates $28^a$, $28^b$, $28^c$ or $28^d$ can be moved individually to regulate the flow of gas and air at different points along the bottom of the kiln.

The number of tunnels 6 and air-pipes 20 that are constructed in the floor of the kiln will depend upon the heating element and also upon the character of material which is to be burned in the kiln. While there will be some leakage of both air and gas through the holes 26 into the kiln, this is not of great consequence as the gas will all be consumed and merely an approximate regulation is desirable. By making these tunnels 6 and air passages 20 of large size, the pressure of the gas and air can be reduced to a minimum. The relative areas of the holes 31 in the saddles 30 through which the air flows, and of the notches 33 through which gas enters the kiln, will depend upon the pressures of the air and gas and upon the composition of the gas. The number of the saddles 30 secured to each plate 28 will depend upon the character of the kiln and it may be necessary to change such grouping after the kiln is in operation. I find that it is usually advisable to unite these saddles 30 into groups, of which the end groups are smaller than the middle groups.

Many changes in the details of construction can be made by those skilled in the erection of kilns, without departing from the spirit of my invention.

I claim.

1. In a burner for kilns and ovens, the combination with the floor of the oven having a series of openings, of a gas passage beneath said floor, an air-pipe extending longitudinally of said passage and having a series of openings along its top, and a series of saddles mounted to slide on said air-pipe and extending up to the floor of the kiln and provided with passages to permit the flow of air, and with plates to cut off the flow of both gas and air.

2. In a burner for kilns and ovens, the combination with the floor of the oven having a series of openings, of a passage beneath the floor connecting to a source of fuel gas, an air-pipe extending longitudinally of said passage and having a series of openings along its top, a series of curved plates slidably mounted on said pipe, a group of saddles secured to each plate and formed to close said openings in said floor but to permit the flow of both gas and air through said openings when shifted to proper position.

3. In a burner for kilns and ovens, the combination with the floor of the oven having a series of openings, of a gas passage beneath said floor, an air-pipe extending longitudinally of said passage and having a series of openings along its top, and a series of saddles mounted to slide on said air-pipe and extending up to the floor of the oven and provided with passages to permit the flow of air, and with plates to cut off the flow of both gas and air, said plates having notches to permit the flow of gas.

4. In a burner for kilns and ovens, the combination of a gas-conductor and metal plates covering it, a layer of refractory material covering the metal plates, said plates and refractory material having a series of openings, a longitudinal pipe in said conductor and having openings which are just below the openings in said plates, a series of saddles slidable on said pipe and having passages to connect the openings in the pipe with those in the plates and laterally extending flanges of such size that the holes in the plates may be covered thereby, which flanges are notched to permit the flow of gas from the conductor through the holes in the plates, means to unite the saddles into groups, and means to slide the saddles along the pipe to open or close the openings in the pipe and plates.

In testimony whereof I have signed this specification in the presence of two subscribing witnesses.

JOHN T. UNDERWOOD.

Witnesses:
 HUGO W. KREINBRING,
 WILLIAM F. MALOW.

---

Copies of this patent may be obtained for five cents each, by addressing the "Commissioner of Patents, Washington, D. C."